U. NEHRING.
STEERING GEAR.
APPLICATION FILED MAR. 2, 1907.
905,912.
Patented Dec. 8, 1908.
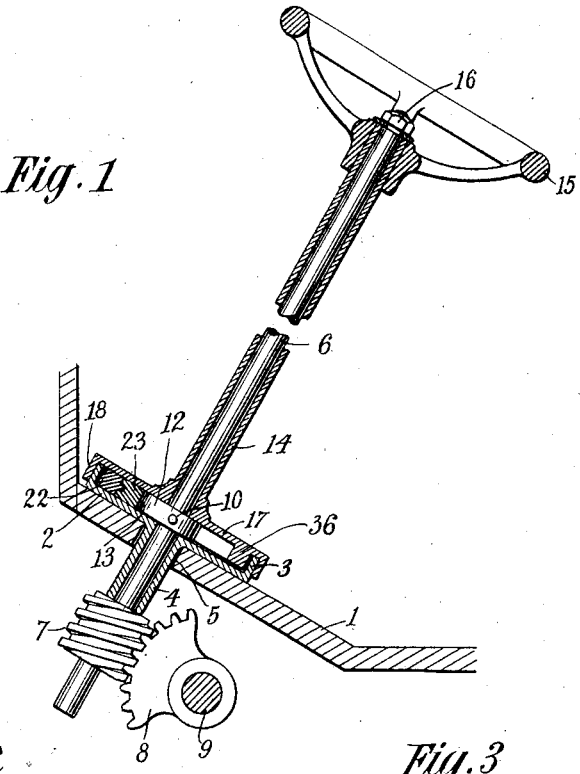
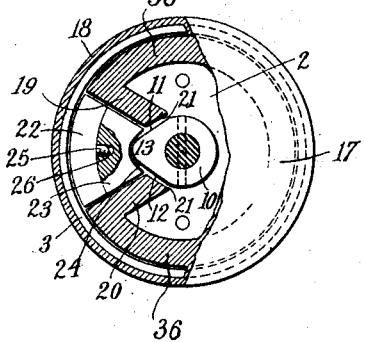
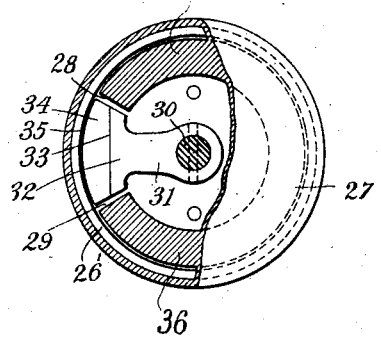
Witnesses:
U. Nehring
Inventor
By his Attorneys
Kerr, Page & Cooper

UNITED STATES PATENT OFFICE.

ULRICH NEHRING, OF NEW YORK, N. Y., ASSIGNOR OF ONE-HALF TO OSCAR F. EHRLE, OF NEW YORK, N. Y.

STEERING-GEAR.

No. 905,912.  Specification of Letters Patent.  Patented Dec. 8, 1908.

Application filed March 2, 1907. Serial No. 360,211.

*To all whom it may concern:*

Be it known that I, ULRICH NEHRING, a citizen of the United States, residing at New York, in the county and State of New York, have invented certain new and useful Improvements in Steering-Gears, of which the following is a specification.

My invention relates to new and useful improvements in steering gear generally and more particularly to that used in connection with motor-driven vehicles, and the object is to provide a construction which is simple, effective and satisfactory in use, and which will embody features which will prevent any deviation, shock or jar of the steering wheels from being transmitted therefrom, and the steering gear proper, to the manually operated device by means of which the steering gear is controlled.

To the end stated the invention consists in providing between the steering lever or wheel and steering gear proper of a motor vehicle, an improved and simplified clutch or mechanical connecting device which will positively transmit to the gear any force applied to the wheel in controlling or steering, but which will be ineffective to transmit motion from the steering gear to the wheel, so that the operator will at all times be enabled to maintain a secure grasp on the latter.

I have fully and clearly illustrated my invention in the accompanying drawings to be taken as a part of this specification, and wherein Figure 1 is a longitudinal central section through a portion of a steering gear embodying my invention. Fig. 2 is a transverse section through a preferred form of clutch forming part of the invention, and Fig. 3 is a transverse section of a clutch of modified but efficient construction.

Referring to the drawings, 1 designates the floor portion of a motor vehicle upon which the invention is supported. Mounted immovably upon the floor 1, is a base plate 2, formed with an annular upwardly directed flange 3, constituting a fixed engaging surface and a central, downwardly projecting sleeve 4, extending down beneath the floor of the vehicle through an opening 5 therein. Extending through this sleeve 4, and rotatable on its longitudinal axis therein, is a rod or shaft 6, the lower end of which projects below the lower end of the sleeve and has keyed thereto a worm 7 meshing with a worm segment 8 connected to a rock shaft 9, forming part of the steering gear.

Rigidly connected to the post or rod 6, is a radial element which may be a cam 10 formed with opposite inclined faces 11, 12, which converge in a curved or rounded nose 13, said cam being arranged to turn on the plate 2 within the annular flange thereof. The post or rod 6 extends upwardly a convenient distance and surrounding the same is a sleeve 14, the latter being designed to rotate about said rod and carrying at its upper end a hand-wheel 15 by which it is turned, the sleeve being maintained in position on the rod by any suitable means, such as a nut 16 threaded onto the latter and engaging the head of the sleeve as shown. At its lower end the sleeve 14 is provided with an annular element 17 formed with an annular circumferential flange 18, projecting downwardly about and closely engaging the flange 3 on the plate 2, but sufficiently free therefrom to permit the easy rotation of the sleeve and element 17 with relation to the said plate and its flange. On its under face the element 17 is provided with spaced radial abutments 19, 20, having engaging surfaces as shown, extending radially from the center of the shaft 6 and sleeve, thus forming a segmental space between the abutments, the inner ends of the latter terminating short of the center of the element 17, and spaced apart as shown, the arrangement being such that when the parts are assembled the nose 13 of the cam 10 projects between said inner ends and for a distance within the segmental space between the abutments. Each of the abutments is formed with a face 21, at an angle to its radial face and close to, but slightly removed from the adjacent inclined face 11 or 12 of the cam 10. The arrangement is such that upon rotation of the element 17, one or the other faces 21, engages an adjacent side of the cam 10 and rotates the latter and consequently the shaft 6.

It will be seen from the above description that any rotative force applied to the hand wheel and sleeve 14 will be communicated to the shaft 6, and I will now proceed to describe in detail my improved means for preventing a rotative force applied directly to the shaft 6, as when an obstruction in the road swerves the wheels, from being transmitted to the sleeve 14 and wheel 15.

Located in the segmental space between the radial faces of the abutments 19, and resting loosely upon the upper face of the plate 2, is a clutch block or shoe formed of inner and outer sections 22, 23, said block being substantially segmental in contour, the outer section being formed with its outer face on an arc substantially parallel with the flange 3, and the inner section having a recess 24 into which the nose of the cam 10 projects. It will be seen that the radial sides of the clutch block lie close to and are parallel with the radial faces of the abutments 19, so that when the element 17 is rotated, the block will be engaged by the abutments and carried with said element.

The operation of the construction just described is as follows: The operator in steering the body to which the invention is applied, does so in the usual manner by rotating the hand-wheel 15 in the direction it is desired to take, and this force is transmitted through the sleeve 14 to the element 17, and one or the other of the abutments strikes the adjacent side of the clutch block or shoe and moves the same with said element, and the latter continuing to rotate the face 21 of the abutment strikes the adjacent face 12 of the cam and thereby rotates the shaft or rod 6, to shift the guiding elements. During this operation the clutch block moves idly with the element 17 and cam 10 and in no way interferes with or retards the steering operation. However, should the shaft 6 be partially rotated from any cause, other than the operation of the manual steering means, the cam 10, will turn with said shaft and its nose 13, strike the wall of the recess in the clutch block and force the latter outwardly into engagement with the flange 3 to effectively lock the shaft 6 against rotation before the cam can engage the abutment 19 and transmit motion from the shaft 6 to the element 17, sleeve 14 and wheel 15. It will be apparent that this latter operation and result are effected by the peculiar formation of the walls of the recess in the block, but while the formation shown is satisfactory in accomplishing the desired result, I desire it understood that any form of coacting surfaces having the same effect comes within the spirit and scope of my invention.

In order that the two sections of the clutch block will always move with the element 17 in unison I provide one of said sections with a pin 25 to project into a recess or socket 26 formed in the opposite section. While an integral block, that is one made in a single piece, will effectively serve the purpose intended, the sectional structure has the added advantages that either part may be replaced when incapacitated through wear or other causes without replacing the entire block.

In Fig. 3, I have shown a structure embodying the invention, but differing slightly from the form shown in Figs. 1 and 2. In Fig. 3, 26' designates the fixed annular surface corresponding to that shown at 3 in Figs. 1 and 2. 27 is the rotatable element carrying abutments 28, 29. 30 is the shaft corresponding to the shaft 6, all being substantially the same form as the corresponding parts heretofore described. Rigidly connected to the shaft 30 is a radial arm 31, having an enlarged head 32, formed with a straight flat face 33, which is at right angles to the radial axis of said arm. The side faces of this head project between the abutments 28, 29, and are in position to be struck by the same when the steering sleeve or column is rotated. Arranged in the space between the abutments is a clutch block 34 formed with a flat face to rest against the face 33 of the arm 31, the outer face of said block being arcuate as shown at 35. It will be seen that the rotation of the element 27 will move one or the other of the abutments 28, 29, according to the direction of rotation of the element 27, into simultaneous engagement with one side of the head and an end of the block, and the shaft 30 is rotated; the block swinging around without interfering with such operation. But, should the shaft and arm carried by the same be rotated independently of the element 27, the relative movement between the head 32 and the block 34, owing to the formation of their faces, will throw the block outwardly into engagement with the surface 26, and prevent the rotation of the shaft from being communicated to the steering sleeve.

In order to substantially brace the abutments and the rotatable element carrying the same, the latter, in both forms of the invention may be provided with an annular ring or ridge 36 cast on said element on its lower face and uniting the abutments.

What I claim is:

1. In a steering apparatus, a shaft connected to the guiding elements, a fixed engaging surface adjacent said shaft, a radial element on said shaft to rotate therewith, a manually rotatable member having spaced abutments to directly engage said element on opposite sides of the latter and thereby rotate the shaft in either direction, and a clutch controlled by said radial element and operated thereby to lock the shaft to the fixed engaging surface upon the rotation of said shaft relative to said rotatable member, said clutch being arranged to be engaged by said abutments and prevented from engaging said engaging element when the manually rotatable member is operated.

2. In a steering apparatus, a shaft connected to shift the guiding elements, a fixed engaging surface adjacent said shaft, a radial element on said shaft to rotate therewith, a manually rotatable member having means to engage said element and thereby rotate the shaft, and a radially movable clutch element movable under the control of said radial element to engage said engaging surface upon rotation of said shaft relative to said rotatable member, and thereby clutch the shaft against rotation, said clutch block being arranged to be engaged by a part of the manually rotatable member so that when the latter is rotated the clutch block is prevented from engaging the fixed engaging surface.

3. In a steering apparatus, a shaft geared to shift the guiding elements, a fixed engaging surface adjacent said shaft, a cam on said shaft to rotate therewith, a manually rotatable member having means to engage said cam and thereby rotate the shaft, and a radially movable clutch block movable under the control of said cam to engage said engaging surface upon rotation of said shaft relative to said rotatable member, and thereby clutch the shaft against rotation.

4. In a steering apparatus, a shaft geared to shift the guiding elements, an annular fixed engaging surface surrounding said shaft, a cam on said shaft to rotate therewith, a manually rotatable member having abutments on opposite sides of said cam to engage the same and thereby rotate the shaft, and a movable clutch block loosely mounted between said abutments and movable outwardly by said cam to engage the annular fixed surface and lock the shaft thereto, when the latter is rotated independently of the manually operated rotatable member.

5. In a steering apparatus, a shaft connected to the guiding elements to shift the latter, a fixed engaging surface surrounding said shaft, a radially extending element carried by said shaft, and rotatable therewith, a manually rotatable member having fixed abutments to engage said radially extending element to rotate said shaft, a clutch element movable radially with respect to the shaft and located between said abutments, said clutch element and radial element having engaging faces which co-act when the shaft is rotated independently of said manually rotatable element to move the clutch element outwardly into clutching engagement with said fixed surface, the arrangement being such that when the manually rotatable element is rotated, the radial element and clutch element are simultaneously engaged by the abutments and move together without permitting the clutch element being moved outwardly into engagement with said engaging surfaces.

ULRICH NEHRING.

Witnesses:
M. G. KINGSTON,
F. W. NEHRING.